(12) United States Patent
Gupte et al.

(10) Patent No.: US 8,972,402 B1
(45) Date of Patent: Mar. 3, 2015

(54) RANKING USERS AND POSTS IN SOCIAL NETWORKING SERVICES

(75) Inventors: Mangesh Gupte, Fremont, CA (US); Kumar Mayur Thakur, West Orange, NJ (US)

(73) Assignee: Google Inc., Mountain View, CA (US)

( * ) Notice: Subject to any disclaimer, the term of this patent is extended or adjusted under 35 U.S.C. 154(b) by 141 days.

(21) Appl. No.: 13/485,661

(22) Filed: May 31, 2012

(51) Int. Cl.
*G06F 17/30* (2006.01)
*G06Q 30/00* (2012.01)

(52) U.S. Cl.
CPC .... *G06F 17/30864* (2013.01); *G06F 17/30038* (2013.01)
USPC .......................................... 707/736; 705/26.7

(58) Field of Classification Search
None
See application file for complete search history.

(56) References Cited

U.S. PATENT DOCUMENTS

| | | | | |
|---|---|---|---|---|
| 2007/0239534 | A1* | 10/2007 | Liu et al. .......................... | 705/14 |
| 2008/0133747 | A1* | 6/2008 | Fish ............................. | 709/224 |
| 2009/0133081 | A1* | 5/2009 | Sakai et al. .................... | 725/105 |
| 2010/0191856 | A1* | 7/2010 | Gupta et al. ................... | 709/228 |
| 2010/0198772 | A1* | 8/2010 | Silverman et al. .............. | 706/52 |
| 2010/0287033 | A1* | 11/2010 | Mathur ........................... | 705/10 |
| 2012/0110096 | A1* | 5/2012 | Smarr et al. .................... | 709/206 |
| 2012/0185892 | A1* | 7/2012 | Camplejohn et al. ........... | 725/27 |
| 2012/0191715 | A1* | 7/2012 | Ruffner et al. ................. | 707/738 |
| 2012/0209907 | A1* | 8/2012 | Andrews et al. .............. | 709/204 |
| 2012/0290953 | A1* | 11/2012 | Russell et al. ................. | 715/758 |
| 2013/0006703 | A1* | 1/2013 | Hines et al. ................... | 705/7.29 |
| 2013/0047179 | A1* | 2/2013 | Sakai et al. .................... | 725/25 |
| 2013/0091214 | A1* | 4/2013 | Kellerman et al. ........... | 709/204 |
| 2013/0254025 | A1* | 9/2013 | Liu et al. .................... | 705/14.53 |
| 2013/0268536 | A1* | 10/2013 | Nachiappan et al. ......... | 707/741 |

* cited by examiner

*Primary Examiner* — Tarek Chbouki
(74) *Attorney, Agent, or Firm* — Fish & Richardson P.C.

(57) ABSTRACT

Methods, systems, and apparatus, including computer programs encoded on a computer storage medium, for receiving, from computer-readable memory, a particular item of digital content distributed by a user through a computer-implemented social networking service; identifying, using the one or more processors, a set of items of digital content distributed by the user through the computer-implemented social networking service; receiving interaction data from the computer-readable memory; determining, based on the received interaction data, at least one of a user ranking score associated with the user and an item ranking score associated with the particular item of digital content; and storing the at least one of the user ranking score and the item ranking score in the computer-readable memory.

14 Claims, 6 Drawing Sheets

FIG. 3

RANKING USERS AND POSTS IN SOCIAL NETWORKING SERVICES

BACKGROUND

This specification generally relates to ranking users, and/or particular items of digital content distributed by users in social networking services.

Internet-based social networking services provide a digital medium for users to interact with one another and to share information. For example, users are able to distribute digital content (e.g., posts including textual comments, digital images, digital videos, digital audio, hyperlinks to network-accessible documents, etc.) to other users that they might be connected to within the social networking service. Digital content that is distributed to a user can be displayed to the user automatically in a content stream in a home (or "stream") page, and/or in response to a user query in a search results page.

SUMMARY

Aspects of the subject matter described in this specification may be embodied in methods that include the actions of: receiving, from computer-readable memory, a particular item of digital content distributed by a user through a computer-implemented social networking service; identifying, using the one or more processors, a set of items of digital content distributed by the user through the computer-implemented social networking service; receiving interaction data from the computer-readable memory; determining, based on the received interaction data, at least one of a user ranking score associated with the user and an item ranking score associated with the particular item of digital content; and storing the at least one of the user ranking score and the item ranking score in the computer-readable memory. The items of digital content in the set of items of digital content being distinct from the particular item of digital content. The interaction data representing interactions of one or more recipients with the items of digital content in the set of items of digital content. Other embodiments of this aspect include corresponding systems, apparatus, and computer programs, configured to perform the actions of the methods, encoded on computer storage devices.

These and other embodiments of this aspect may each optionally include one or more of the following features. For instance, the interactions represented by the interaction data can include one or more of: sharing an item of digital content, commenting on an item of digital content and endorsing an item of digital content. The set of items of digital content can include a set of all items of digital content distributed by the user prior to distribution of the particular item of digital content. Determining the user ranking score can include the actions of: determining a recipient-specific user ranking score for each recipient of a set of recipients that have received at least one item of digital content of the set of items of digital content to provide a plurality of recipient-specific user ranking scores; and aggregating the plurality of recipient-specific user ranking scores to determine the user ranking score. Determining a recipient-specific user ranking score can include calculating, using the received interaction data, a probability that a specific recipient of the set of recipients will interact with an item of digital content distributed by the user. The set of recipients can include all direct contacts of the user within the social networking service. Determining the item ranking score can include the actions of: determining a recipient-specific item ranking score for each recipient of a set of recipients that have received the particular digital content item to provide a plurality of recipient-specific item ranking scores; aggregating the plurality of recipient-specific item ranking scores to determine an initial item ranking score; determining a time decay parameter associated with the particular digital content item; and degrading the initial item ranking score based on the time decay parameter to provide the item ranking score. Determining a recipient-specific item ranking score can include calculating, using the received interaction data, a probability that a specific recipient of the set of recipients will interact with the particular digital content item. The methods can further include the actions of: receiving a search query; receiving search results responsive to the search query; determining that the search results include a set of users of a social networking service, and, in response, retrieving a plurality of user ranking scores; determining, based on the plurality of user ranking scores, a user rank order; and providing instructions to display representations of the users based on the user rank order. In some examples, each user ranking score is assigned to a respective user in the set of users. Retrieving a plurality of user ranking scores can include accessing a user index stored in computer-readable memory. The methods can further include the actions of: receiving a search query; receiving search results responsive to the search query; determining that the search results include a plurality of items of digital content distributed through the social networking service, and, in response, retrieving a plurality of item ranking scores; determining, based on the plurality of item ranking scores, an item rank order; and providing instructions to display representations of the digital content items based on the item rank order. Retrieving the plurality of item ranking scores can include accessing item data sets stored in computer readable memory.

Particular embodiments of the subject matter described in this specification may be implemented so as to realize one or more of the following advantages. In some examples, users of social networking services can be categorized and/or ranked based on their activity, and highly interactive users can be provided as recommended contacts to new users of social networking services. In some examples, potentially viral digital content can be discovered before going viral, and digital content can be prioritized and stored to reduce latency.

The details of one or more embodiments of the subject matter described in this specification are set forth in the accompanying drawings and the description below. Other potential features, aspects, and advantages of the subject matter will become apparent from the description, the drawings, and the claims.

BRIEF DESCRIPTION OF THE DRAWINGS

FIG. 3 depicts a screen-shot of an example web page including an activity stream for a user of a social networking service.

DETAILED DESCRIPTION

Figure 1:
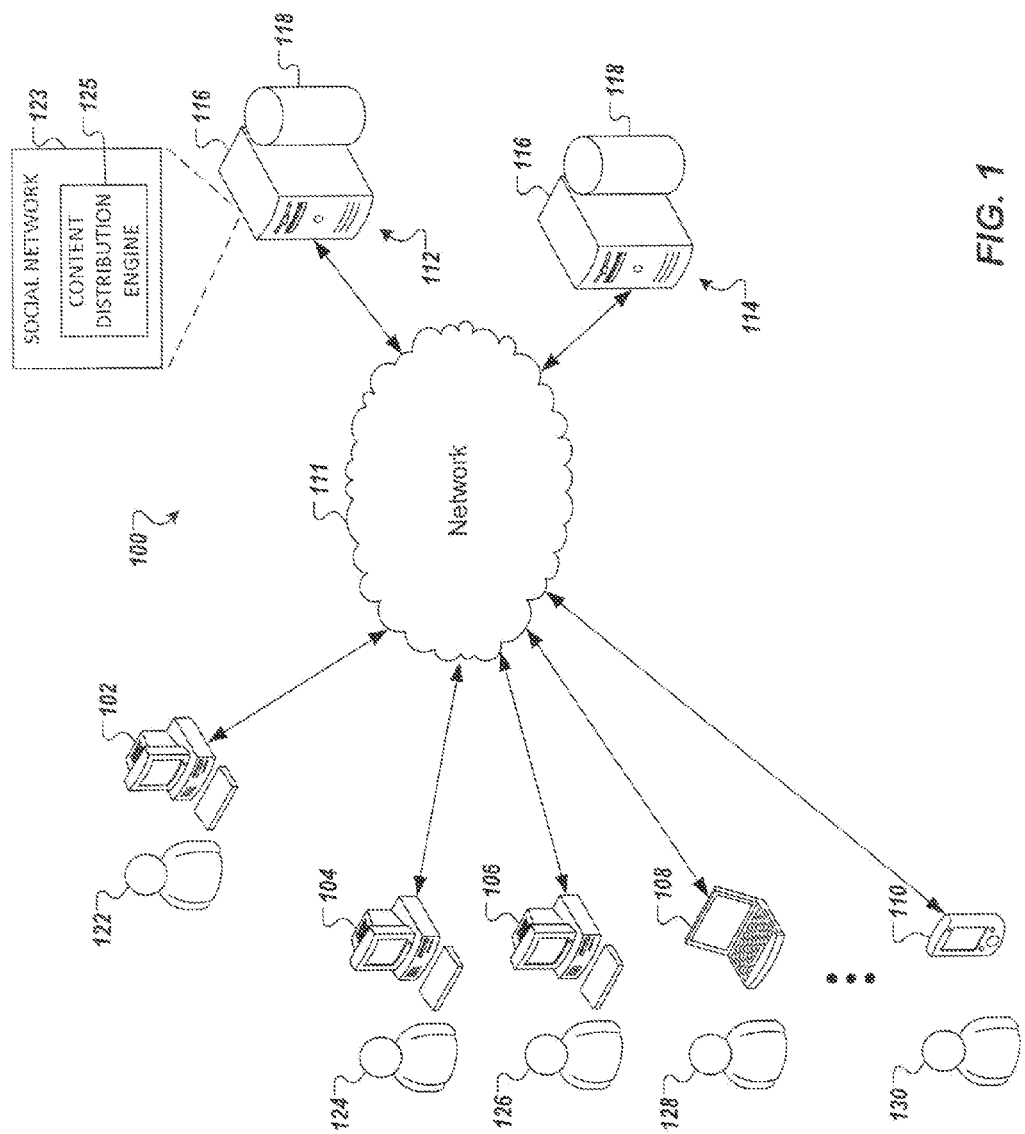
FIG. 1 depicts an example network environment.

Implementations of the present disclosure are generally directed to ranking users, and/or items of digital content distributed by users in social networking services. In some examples, distributed items of content can include textual posts, images, videos, audio, and/or hyperlinks to network-accessible documents (e.g., Web pages). In particular, implementations of the present disclosure are directed to determining a user ranking score for each user of a social networking service, and an item ranking score for each item (e.g., post) distributed by the user. In some examples, discussed in further detail herein, the user ranking score and the item ranking score are determined based on a predictive model and historical data. In some aspects, the user ranking score and the item ranking score provide quantitative measures of how interested other users of the social networking service might be in items distributed by the user and/or in the user that distributed the items.

The network environment 100 includes computing devices 102, 104, 106, 108, 110 that are configured to communicate with a server system 112 over a network 111. The computing devices 102, 104, 106, 108, 110 have respective users 122, 124, 126, 128, 130 associated therewith. The server system 112 includes a computing device 116 and a machine-readable repository, or database 118.

In some examples, the network 111 can include a large computer network, examples of which include a local area network (LAN), wide area network (WAN), the Internet, a cellular network, or a combination thereof connecting a number of mobile computing devices, fixed computing devices, and server systems. The network(s) included in the network 111 can provide for communications under various modes or protocols, examples of which include Transmission Control Protocol/Internet Protocol (TCP/IP), Global System for Mobile communication (GSM) voice calls, Short Electronic message Service (SMS), Enhanced Messaging Service (EMS), or Multimedia Messaging Service (MMS) messaging, Code Division Multiple Access (CDMA), Time Division Multiple Access (TDMA), Personal Digital Cellular (PDC), Wideband Code Division Multiple Access (WCDMA), CDMA2000, or General Packet Radio System (GPRS), among others. Communication can occur through a radio-frequency transceiver. In addition, short-range communication can occur, e.g., using a BLUETOOTH, WiFi, or other such transceiver system.

The computing devices 102, 104, 106, 108, 110 enable the respective users 122, 124, 126, 128, 130 to access and to view documents, e.g., Web pages included in Web sites. For example, the user 122 of the computing device 102 can view a Web page using a Web browser. The Web page can be provided to the computing device 102 by the server system 112 or another server system (not shown).

In the example environment 100, the computing devices 102, 104, 106 are illustrated as desktop-type computing devices, the computing device 108 is illustrated as a laptop-type computing device, and the computing device 110 is illustrated as a mobile computing device. It is noted, however, that the computing devices 102, 104, 106, 108, 110 can include, e.g., a desktop computer, a laptop computer, a handheld computer, a personal digital assistant (PDA), a cellular telephone, a network appliance, a camera, a smart phone, an enhanced general packet radio service (EGPRS) mobile phone, a media player, a navigation device, an electronic messaging device, a game console, or a combination of two or more of these data processing devices or other appropriate data processing devices. In some examples, a computing device is included as part of a motor vehicle (e.g., an automobile, an emergency vehicle (e.g., fire truck, ambulance), a bus).

The users interacting with the computing devices 102, 104, 106, 108, 110 can participate in a social networking service 123 that can be hosted by the server system 112. In some examples, users can interact with the social networking service 123 by uploading and/or downloading digital content that has been distributed through the social networking service. As noted above, example digital content can include text (e.g., updates, announcements, and/or replies), digital images, videos, audio files, hyperlinks and/or other appropriate digital content.

Items of digital content provided by an author can be distributed to selected contacts within the social networking service 123, so that such digital content is viewable by the selected contacts. In some examples, items of digital content items can be publicly distributed using the social networking service 123 such that other users, who are not contacts of, or otherwise related to the author within the social networking service 123 can access the digital content.

In some examples, a user of the social networking service 123 can generate an item of digital content and can define a distribution associated with the item. In some examples, the distribution can include one or more contacts within the social networking service 123, to which the generated content is to be distributed. During an item write-time, an item dataset is transmitted from the user's client computing device (e.g., the computing device 102 of FIG. 1) to a distribution hub (e.g., a content distribution engine 125), which can be provided at a server (e.g., the server system 112 of FIG. 1 or elsewhere on the network). In some examples, the item dataset includes digital content data (e.g., text, identity of the content author, uniform resource indicator (URI), timestamp data, distribution data, and/or identification (ID) data (e.g., an ID assigned to the content data set upon generation of the content). In some examples, other data is appended to item data sets. Example other data can include scoring data. In some examples, scoring data can include an item ranking score, discussed in further detail herein.

In some examples, the distribution data is processed to provide an access control list (ACL) that specifies which contacts within the social networking service are granted access to the item of digital content. For example, distribution data can indicate that content is to be accessible by, and/or distributed to, a particular user and/or a particular group of users. In some examples, the ACL can be amended or updated to control access of the associated item based on the soft posting techniques described herein.

Generally, the distribution hub determines end points to which the item data set is to be distributed based, e.g., on the ACL. For example, the set of contacts that can interact with the content and/or that are allowed access to the content is determined based on the ACL, and the ID of the content is written to a per user/view index at the distribution hub. When fetching content to distribute to a user, the user/view index is accessed and the IDs of the various contents that the user is allowed to view are determined. The item data sets are retrieved from a data store (e.g., the data store 118 of FIG. 1) and are transmitted to a client device associated with the requesting user. In some examples, digital content of the item is distributed to a user's main page for inclusion in an item stream. Distributed items can also be provided in response to a user query on a search results page.

Figure 2:
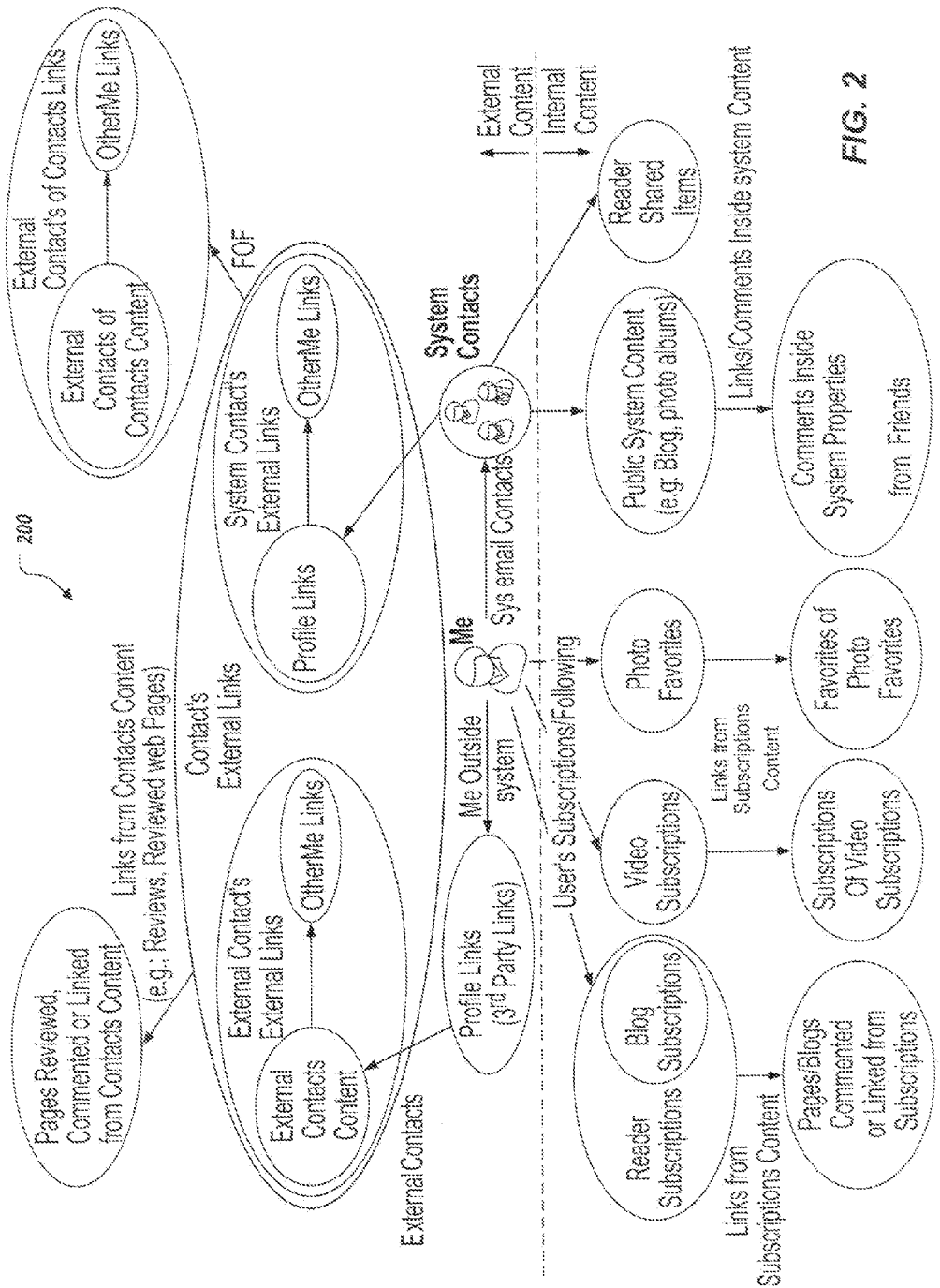
FIG. 2 is a diagram of example sources of social graph information.

FIG. 2 is a diagram 200 of example sources of social graph information. In some examples, contacts associated with a particular user can be identified using a social graph of the user. As used in this specification, a social graph can refer to a single social graph or multiple interconnected social graphs. Distinct social graphs can be generated for different types of connections a user has. For example, a user can be connected with chat contacts in one social graph, electronic messaging contacts in a second social graph, and connections (or contacts) from a particular social networking service in a third social graph. Each social graph can include edges to additional individuals or entities at higher degrees of separation from the user. These contacts can in turn have additional contacts at another degree of separation from the user. Similarly, a user's connection to someone in a particular social network can be used to identify additional connections based on that person's connections. The distinct social graphs can include edges connecting one or more social graph to one or more other social graphs.

Types of connections and social graphs can include, but are not limited to other users in which the user is in direct contact (e.g., user mail or chat contact, direct contacts on social sites) and users in which the user is in indirect contact (e.g., friends of friends, connections of users that have a direct connection to the user). In some examples, the social graph includes content generated by individuals (e.g., blog posts, reviews) as connections to the user. The social graph can include connections within a single network or across multiple networks (separable or integrated). Public social graph relationships can also be considered. In some examples, public relationships can be established through public profiles and/or public social networking services.

Figure 3:
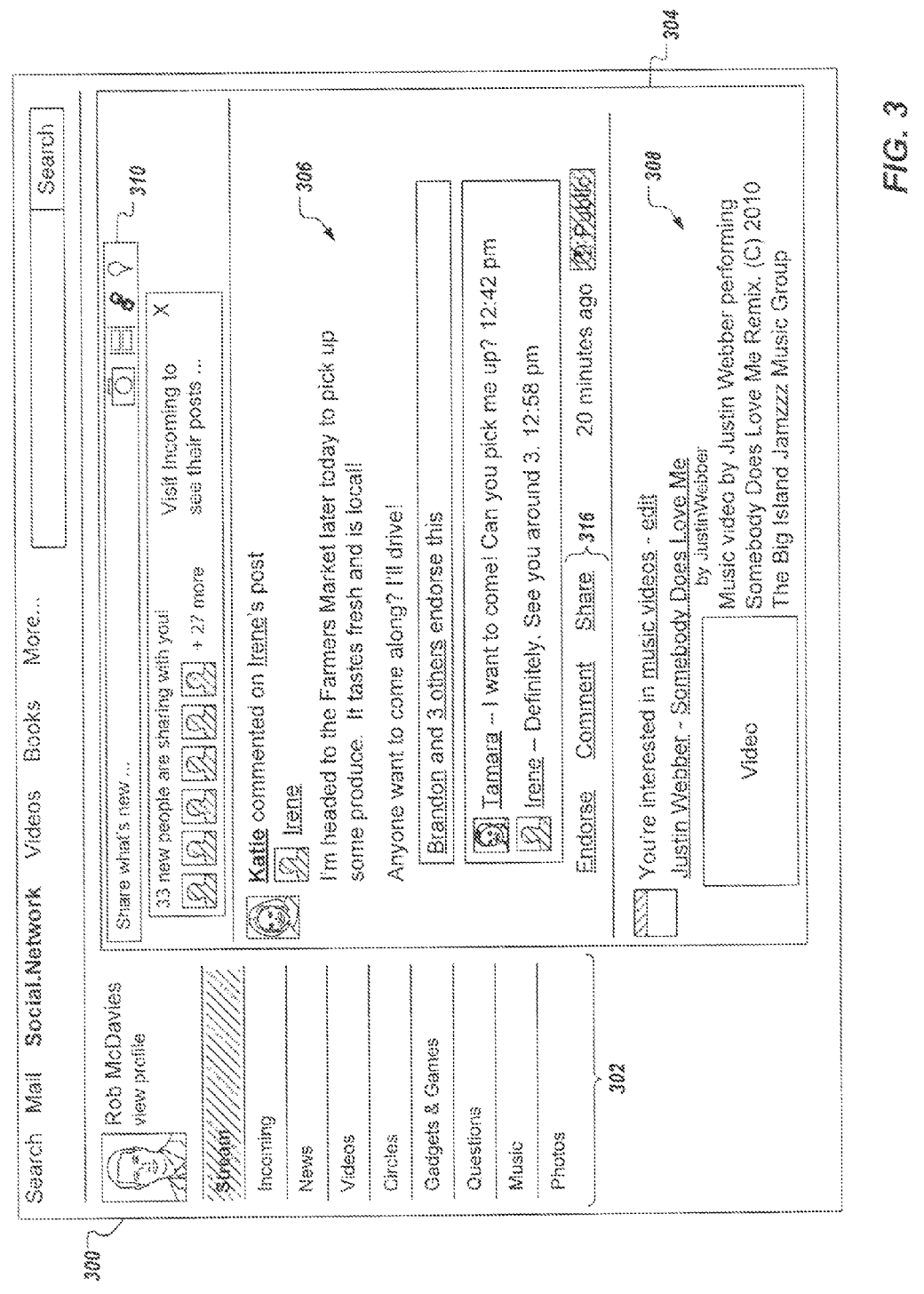

FIG. 3 depicts a screen-shot of an example web page 300 including an activity stream 304 for a user of a social networking service. For example, the web page 300 can be provided as a web page within a website of a social networking service, and can display items of digital content that have been shared with a user associated with the web page 300. In the illustrated example, the example user includes "Rob McDavies" and the web page 300 displays items of digital content that other users have shared with the user and/or items that the user has shared with other users. The web page 300 includes a social network menu 302 and the activity stream 304. As used herein, the term activity stream can include a graphically displayable collection of items that have been distributed to and/or from, or are otherwise accessible by a user of a social networking service. Example items 306, 308 that have been distributed to the user are displayed in the activity stream 304. Generally, the items 306, 308 displayed in the activity stream 304 include digital content that is distributed to the user from contacts established within the social networking service. A content sharing interface 310 can also be provided. The user can activate (e.g., click on) the content sharing interface 310 to share digital content. Although two items 306, 308 are depicted in FIG. 3, it is appreciated that the activity stream 304 can display any number of items to the user.

Users can interact with items of digital content by endorsing the item, sharing the item and/or commenting on the item. In the example of FIG. 3, each of the items 306, 308 can include associated interaction elements 312. The interaction elements 312 can be activated by the user (e.g., by clicking on them) to interact with the items 306, 308.

Implementations of the present disclosure are directed to generating user ranking scores and item ranking scores based on historical data associated with a user and items distributed by the user. In some examples, a user ranking score can be determined for a user based on items distributed by the user in a social networking service and interactions of other users of the social networking service with the distributed items. The user ranking score can provide a quantitative measure of how interested other users of the social networking service might be in items distributed by the user. In some examples, an item ranking score can be determined for each item distributed by the user through the social networking service. The item ranking score can provide a quantitative measure of how interested other users of the social networking service might be in the item. In some examples, a user rank order for a plurality of users can be determined based on respective user ranking scores, and representations of the plurality of users can be displayed based on the user rank order. In some examples, an item rank order for a plurality of items can be determined based on respective item ranking scores, and the items can be displayed based on the item rank order.

In some examples, a user ranking score ($RS_{USER}$) is determined based on a plurality of recipient-specific user ranking scores ($RS_{REC}$). In some examples, a recipient-specific user ranking score can indicate the probability that a recipient will interact with an item distributed by a user. In some examples, recipient-specific user ranking score can be provided based on the following relationship:

$$RS_{REC_i} = \frac{Q_i + \alpha}{T_i + \beta}$$

where i indicates the i'th recipient in a set of 1 to n recipients that have received items of digital content from the user, Q indicates the number of interactions of the i'th recipient with items received from the user, T indicates the number of items distributed by the user and received by the recipient, and α and β are constants. In some examples, α and β determined by empirical analysis of interactions. In some examples, α and β are constants between 0.5 and 1 and can be chosen such that the ratio of α to β is equal to the ratio of Q to T. In some examples, α and β can be determined based on aggregated data over the social networking service or a sub-part of the social networking service that the users interact with, and can provide an estimate of the interaction rate between the users in the absence of specific data reflecting an actual interaction rate.

In some examples, the set of 1 to n recipients includes all direct contacts of the user within the social networking service. In some examples, the set of 1 to n recipients includes all direct contacts and contacts of direct contacts of the user within the social networking service. In some examples, Q and T are provided based on accumulated historical data that is associated with a total number of items distributed by the user to recipients over a given time period (e.g., X number of seconds, hours, days, weeks, months or years, where X is an integer greater than 0). In some examples, the accumulated data includes a total number of interactions (e.g., endorsements, shares and/or comments) by the recipient with items distributed by the user over the given time period.

The recipient-specific user ranking scores can be provided as quantifiable probability ratios that reflect the relative frequency with which a particular recipient interacts with items distributed by a particular user. In some examples, the recipient-specific user ranking scores can range between a minimum value (e.g., 0) and a maximum value (e.g., 1). A relatively high recipient-specific user ranking scores (e.g., above 0.5) can indicate that the recipient user is interested in content items distributed by the author.

The user ranking score associated with the user can be determined based on the following relationship:

$$RS_{USER} = \sum_{i=1}^{n} RS_{RECi}$$

In some examples, the user ranking score can change over time. In some examples, a recipient-specific user ranking score can change in response to the associated recipient actually interacting with an item distributed by the user. Consequently, Q can increase over time (e.g., can converge toward T), thereby changing the user ranking score. In some examples, a recipient-specific user ranking score can change in response to the user distributing more items. Consequently, T can increase over time, thereby changing the user ranking score.

The user ranking scores each represent the respective probability that other users (e.g., recipients) connected to the user in the social networking service might interact with items distributed by the user. In other words, each user ranking score reflects a total number of probable interactions by contacts of the user with items distributed by the user through the social networking service sometime in the future. In some examples, a user with relatively high user ranking score can include a user that has a relatively high number of contacts that interact with content distributed by the user.

In some examples, the user ranking scores for a plurality of users of the social networking service can be stored in a user index (e.g., in computer-readable memory). In this manner, the user ranking scores of particular users can be retrieved for use. In some examples, the user ranking score for each user can be periodically updated (e.g., every Y minutes, hours, days, weeks, months, years). In some examples, the user ranking score can be dynamically updated (e.g., in response to interaction with an item distributed by the user).

In some examples, and as discussed in further detail herein, an item ranking score ($RS_{ITEM}$) is determined for each item distributed by the user and can be based on an initial item ranking score ($RS_{IINIT}$) and a time decay ($\omega$). The initial item ranking score can be determined based on a plurality of recipient-specific item ranking scores ($RS_{IREC}$). In some examples, a recipient-specific item ranking score can indicate the probability that a recipient interacts with the item distributed by the user.

In some examples, each recipient-specific item ranking score is provided based on the following relationship:

$$RS_{IRECi} = \frac{G_i + \alpha}{F_i + \beta}$$

where i indicates the i'th recipient in a set of 1 to m recipients that have received the item of digital content from the user, G indicates the number of interactions of the i'th recipient with items received from the user, F indicates the number of items distributed by the user and received by the recipient, and $\alpha$ and $\beta$ are constants, as discussed above. In some examples, the set of 1 to m recipients includes all direct contacts of the user within the social networking service that the user has distributed the item to (i.e., all contacts included on a user-defined ACL associated with the item). In some examples, the set of 1 to m recipients includes all direct contacts that the user has distributed the item to and contacts of the direct contacts within the social networking service. In some examples, G and F are provided based on accumulated data that is associated with a total number of items distributed by the user to recipients over a given time period (e.g., X number of seconds, hours, days, weeks, months or years, where X is an integer greater than 0).

The initial item ranking score associated with the item can be determined based on the following relationship:

$$RS_{IINIT} = \sum_{i=1}^{m} RS_{IRECi}$$

The item ranking score can be a function of time and can be determined based on the initial item ranking score and the time decay. In some examples, the item ranking score is determined based on the following relationship:

$$RS_{ITEMt} = (RS_{IINIT})(\omega)$$

where t indicates a time since the item was distributed by the user. In some examples, t can be determined as the difference between a current time and the time that the item was distributed. In some examples, the current time can include the time at which the item ranking score is being determined. In some examples, the time decay can be provided based on the following relationship:

$$\omega = ?\frac{1}{t^k}$$

By way of non-limiting example, a first item ranking score for an item can be determined based on a first time and a second item ranking score for the item can be determined based on a second time, where the second time is later than the first time. Accordingly, the first item score can be greater than the second item score as a result of application of the time decay. An item of content with a relatively high item ranking score associated therewith can generally be considered as being of potentially more interest to users than items with lower item ranking scores. In this manner, the item ranking score for a particular item can decrease over time.

In some examples, the item ranking score can change over time based on user interactions. In some examples, a recipient-specific item ranking score can change in response to the associated recipient actually interacting with the item. For example, when a particular recipient interacts with the item, the associated recipient-specific item ranking score can be set to a maximum value (e.g., 1), thereby changing the item ranking score. In some examples, a recipient-specific item ranking score can change in response to the associated recipient interacting with other items distributed by the user. Consequently, G can increase over time (e.g., can converge toward F), thereby changing the item ranking score. In some examples, a recipient-specific item ranking score can change in response to the user distributing more items. Consequently, F can increase over time, thereby changing the item ranking score.

In some examples, the item ranking scores for a plurality of items distributed using the social networking service can be stored in an item index (e.g., in computer-readable memory). In some examples, respective item ranking scores can be stored in respective item data sets, discussed above. In this manner, the item ranking scores of particular items can be retrieved for use. In some examples, the item ranking score for each item can be periodically updated (e.g., every Y minutes, hours, days, weeks, months, years). In some examples, the item ranking score can be dynamically updated (e.g., in response to user interaction with an item).

Each of the user ranking score and the item ranking score can be used to rank respective users and items in respective pluralities of users and items. For example, a plurality of users can be provided and each user can have an associated user ranking score. A user rank order can be defined based on the user ranking scores. In some examples, the user rank order can include an ascending order of the user ranking scores. In some examples, the user rank order can include a descending order of user ranking scores. In some examples, representations of each user in the plurality of users can be displayed in the user rank order. By way of non-limiting example, a searching user can submit a search query to the social networking service. Search results can be generated based on the search query. The search results can include the plurality of users. Consequently, representations of the users of the plurality of users can be provided in search results that are displayed to the searching user. The representations can be displayed in the user rank order. Example representations can include thumbnail images associated with the users in the social networking service.

As another example, a plurality of items can be provided and each item can have an associated item ranking score. An item rank order can be defined based on the item ranking scores. In some examples, the item rank order can include an ascending order of the item ranking scores. In some examples, the item rank order can include a descending order of item ranking scores. In some examples, each item of the plurality of items can be displayed in the item rank order. By way of non-limiting example, a searching user can submit a search query to the social networking service. Search results can be generated based on the search query. The search results can include the plurality of items. Consequently, the items of the plurality of users can be provided in search results that are displayed to the searching user. The items can be displayed in the item rank order.

While the above non-limiting examples describe one or more aspects of the present disclosure, further implementations are also envisioned. For example, other types of social interaction data can be accumulated and used to determine user ranking scores and/or item ranking scores. Further, other suitable statistical models can be used to determine user ranking scores and/or item ranking scores.

Figure 4:
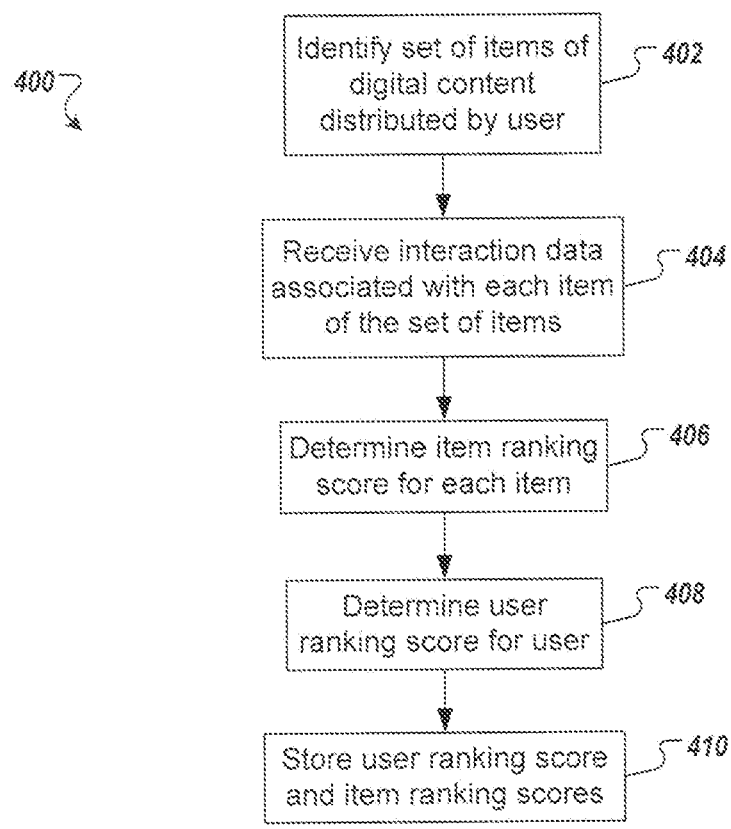
FIG. 4 depicts an example process that can be executed in implementations of the present disclosure.

FIG. 4 depicts an example process 400 that can be executed in implementations of the present disclosure. The example process 400 can be executed using one or more computing devices. For example, the mobile computing device 102 and/or the server systems 112 and 114 of FIG. 1 can be used to execute the example process 400. In some examples, the example process 400 can be performed for each user of a plurality of users of a social networking service.

A set of items of digital content distributed by a user is identified (402). Interaction data associated with each item of the set of items is received (404). In some examples, interaction data can indicate interactions that one or more recipients have had with an item. Example interactions can include endorsing, sharing and/or commenting on the item. An item ranking score is determined for each item in the set of items (406). Determination of the item ranking score is discussed in further detail above and with reference to FIG. 5 below. A user ranking score for the user is determined (408). Determination of the user ranking score is discussed in further detail above and with reference to FIG. 6 below. The user ranking score and the item ranking scores are stored (410). In some examples, the user ranking score is stored in a user index (e.g., in computer-readable memory). In this manner, the user ranking scores of particular users can be retrieved for use. In some examples, the item ranking scores are stored in an item index (e.g., in computer-readable memory). In some examples, respective item ranking scores can be stored in respective item data sets, discussed above. In this manner, the item ranking scores of particular items can be retrieved for use.

Figure 5:
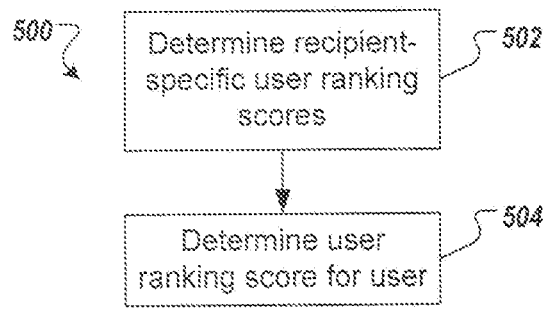
FIG. 5 depicts an example process that can be executed in implementations of the present disclosure.

FIG. 5 depicts an example process 500 that can be executed in implementations of the present disclosure. The example process 500 can be executed using one or more computing devices. For example, the mobile computing device 102 and/or the server systems 112 and 114 of FIG. 1 can be used to execute the example process 500. In some examples, the example process 500 can be performed for each user of a plurality of users of a social networking service.

Recipient-specific user ranking scores are determined (502). In some examples, and as discussed above, a recipient-specific user ranking score can be determined for each user in a set of recipients that have received an item of digital content from the user. In some examples, the recipient-specific user ranking score is determined based on a number of interactions of the particular recipient with items received from the user, the number of items distributed by the user and received by the particular recipient, and one or more constants. The user ranking score is determined for the user (504). In some examples, and as discussed in detail above, the user ranking score is determined as a sum of the recipient-specific user ranking scores.

Figure 6:
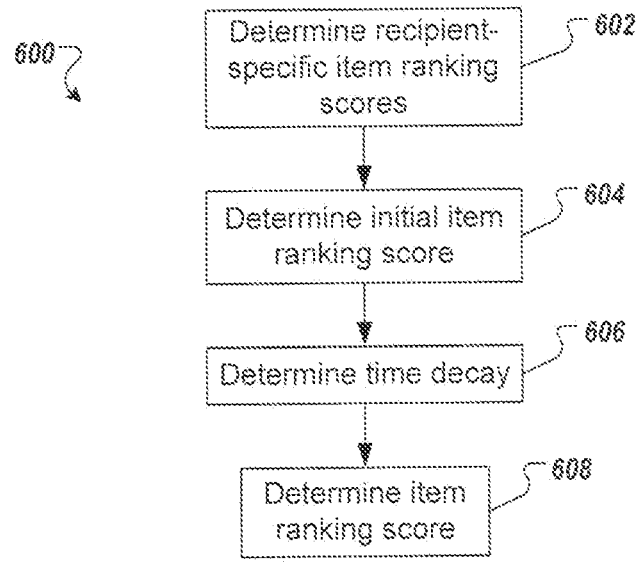
FIG. 6 depicts an example process that can be executed in implementations of the present disclosure.

FIG. 6 depicts an example process 600 that can be executed in implementations of the present disclosure. The example process 600 can be executed using one or more computing devices. For example, the mobile computing device 102 and/or the server systems 112 and 114 of FIG. 1 can be used to execute the example process 600. In some examples, the example process 600 can be performed for each item of a plurality of items distributed by a user of a social networking service.

Recipient-specific item ranking scores are determined (602). In some examples, and as discussed in further detail herein, a recipient-specific item ranking score can be determined for each user in a set of recipients that have received the item of digital content from the user. In some examples, the recipient-specific item ranking score is determined based on the number of interactions of the recipient with items received from the user, the number of items distributed by the user and received by the recipient and one or more constants. In some examples, the recipient-specific item ranking score is determined based on whether the recipient has actually interacted with the item (e.g., set to a maximum value, if the recipient has interacted with the item).

An initial item ranking score is determined (604). In some examples, and as discussed above, the initial item ranking score is determined as the sum of the recipient-specific item ranking scores. A time decay is determined (606). In some examples, and as discussed above, the time decay is determined based on a current time and a time at which the item was distributed. The item ranking score for the item is determined (608). In some examples, and as discussed above, the item ranking score is determined as a product of the initial item ranking score and the time decay.

Figure 7:
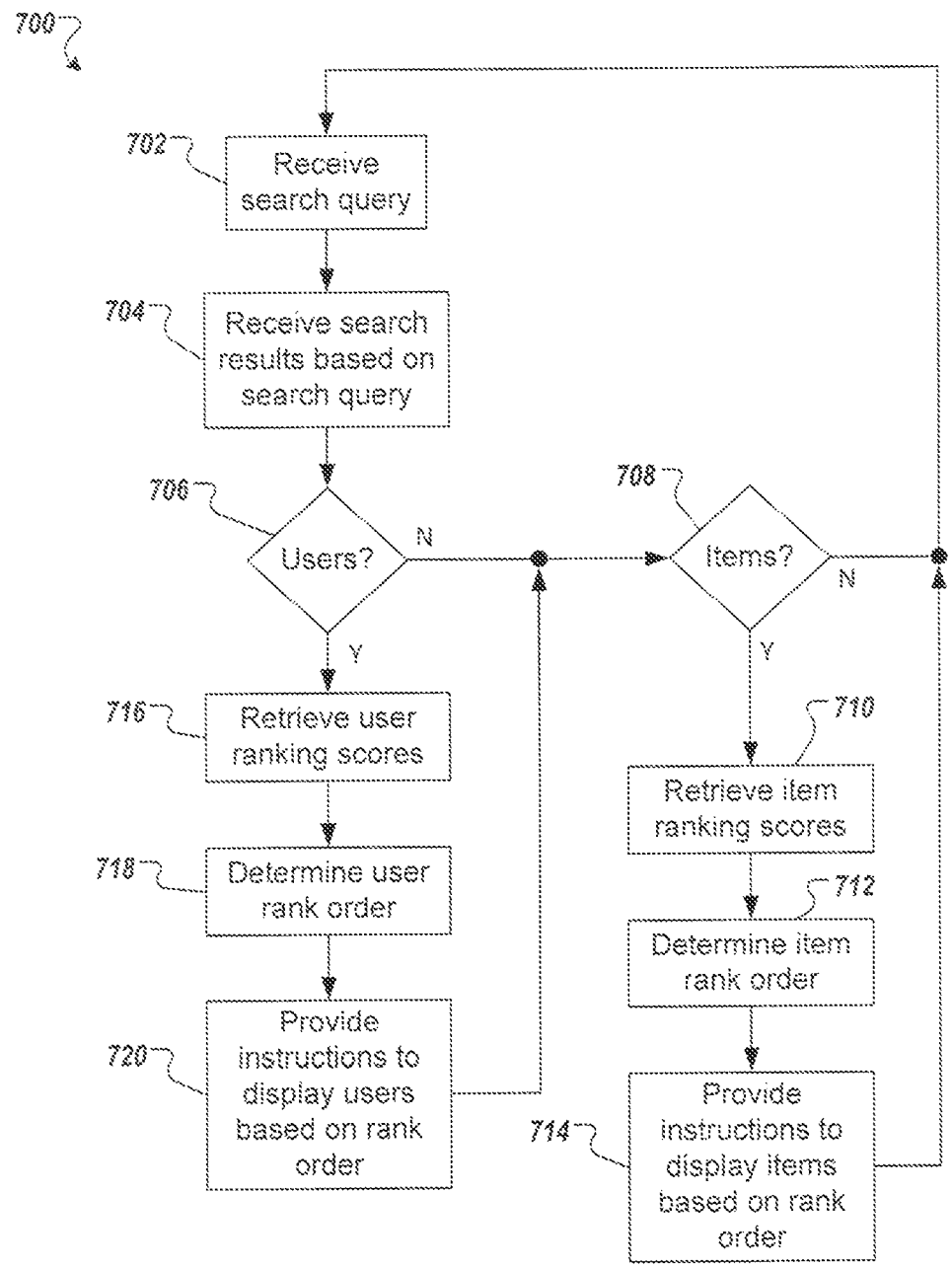
FIG. 7 depicts an example process that can be executed in implementations of the present disclosure.

FIG. 7 depicts an example process 700 that can be executed in implementations of the present disclosure. The example process 700 can be executed using one or more computing devices. For example, the mobile computing device 102 and/or the server systems 112 and 114 of FIG. 1 can be used to execute the example process 700.

A search query is received (702). In some examples, a search query can be generated by a searching user and can be received by the social networking service. Search results responsive to the search query are received (704). In some examples, the search query can be provided to a computer-implemented search service, the search service can generate and provide the search results. It is determined whether the search results include users of the social networking service (706). If the search results do not include users of the social networking service, it is determined whether the search results include items of digital content distributed through the social networking service (708). If the search results do not include items of digital content distributed through the social networking service, the process 700 loops back.

If the search results include items of digital content distributed through the social networking service, an item ranking score associated with each item is retrieved (710). In some examples, the item ranking scores can be retrieved from associated item data sets stored in computer-readable memory. An item rank order is determined (712). For example, the item rank order is determined based on the item ranking scores, as discussed above. Instructions are provided to display the items based on the item rank order (714). In some examples, the instructions are provided to the computer-implemented search service, which provides the search results for display to the searching user.

If the search results include users of the social networking service, a user ranking score associated with each user is retrieved (716). In some examples, the user ranking scores can be retrieved from a user index stored in computer-readable memory. A user rank order is determined (718). For example, the user rank order is determined based on the user ranking scores, as discussed above. Instructions are provided to display representations of the users based on the user rank order (720). In some examples, the instructions are provided to the computer-implemented search service, which provides the search results for display to the searching user.

A number of implementations have been described. Nevertheless, it will be understood that various modifications may be made without departing from the spirit and scope of the disclosure. For example, various forms of the flows shown above may be used, with steps re-ordered, added, or removed. Accordingly, other implementations are within the scope of the following claims.

Implementations of the present disclosure and all of the functional operations provided herein can be realized in digital electronic circuitry, or in computer software, firmware, or hardware, including the structures disclosed in this specification and their structural equivalents, or in combinations of one or more of them. Implementations of the invention can be realized as one or more computer program products, i.e., one or more modules of computer program instructions encoded on a computer readable medium for execution by, or to control the operation of, data processing apparatus. The computer readable medium can be a machine-readable storage device, a machine-readable storage substrate, a memory device, a composition of matter effecting a machine-readable propagated signal, or a combination of one or more of them. The term "data processing apparatus" encompasses all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, or a combination of one or more of them.

A computer program (also known as a program, software, software application, script, or code) can be written in any form of programming language, including compiled or interpreted languages, and it can be deployed in any form, including as a stand alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this disclose can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Moreover, a computer can be embedded in another device, e.g., a mobile telephone, a personal digital assistant (PDA), a mobile audio player, a Global Positioning System (GPS) receiver, to name just a few. Computer readable media suitable for storing computer program instructions and data include all forms of non volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

To provide for interaction with a user, implementations of the invention can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

Implementations of the invention can be realized in a computing system that includes a back end component, e.g., as a data server, or that includes a middleware component, e.g., an application server, or that includes a front end component, e.g., a client computer having a graphical user interface or a Web browser through which a user can interact with an implementation of the invention, or any combination of one or more such back end, middleware, or front end components. The components of the system can be interconnected by any form or medium of digital data communication, e.g., a communication network. Examples of communication networks include a local area network ("LAN") and a wide area network ("WAN"), e.g., the Internet.

The computing system can include clients and servers. A client and server are generally remote from each other and typically interact through a communication network. The relationship of client and server arises by virtue of computer programs running on the respective computers and having a client-server relationship to each other.

While this disclosure contains many specifics, these should not be construed as limitations on the scope of the disclosure or of what may be claimed, but rather as descriptions of features specific to particular implementations of the disclosure. Certain features that are described in this disclosure in the context of separate implementations can also be provided in combination in a single implementation. Conversely, various features that are described in the context of a single implementation can also be provided in multiple implementations separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the implementations described above should not be understood as requiring such separation in all implementations, and it should be understood that the described program components and systems can generally be integrated together in a single software product or packaged into multiple software products.

Thus, particular implementations of the present disclosure have been described. Other implementations are within the scope of the following claims. For example, the actions recited in the claims can be performed in a different order and still achieve desirable results.

What is claimed is:

1. A computer-implemented method executed using one or more processors, the method comprising:
   identifying, by the one or more processors, a set of items of digital content distributed by the user through a computer-implemented social networking service;
   receiving, from the computer-readable memory, interaction data, the interaction data representing interactions of two or more recipients with the items of digital content in the set of items of digital content;
   determining, based on the received interaction data, a number of interactions by each recipient of the two or more recipients with the set of items of digital content;
   identifying a number of items included by the set of items of digital content that is distributed by the user through the computer-implemented networking service to the two or more recipients;
   determining, by the one or more processors and based on the received interaction data, i) for each recipient of the two or more recipients, a recipient-specific user ranking score of the user with respect to the recipient and ii) an item ranking score associated with each item of the set of items of digital content, each recipient-specific user ranking score based on i) the number of interactions by the associated recipient with the set of items of digital content and ii) the number of items included by the set of items of digital content;
   storing, by the one or more processors, for each recipient of the two or more recipients, the recipient-specific user ranking score and the item ranking score associated with each item of the set of items in the computer-readable memory; and
   providing for display one or more of the set of items of digital content based on the user ranking score and the item ranking score.

2. The method of claim 1, wherein the interactions represented by the interaction data comprise electronic interactions selected from a group consisting of sharing an item of digital content, commenting on an item of digital content and endorsing an item of digital content.

3. The method of claim 1, wherein determining the recipient-specific user ranking score comprises:
   for the two or more recipients, aggregating the recipient-specific user ranking scores of the user with respect to each recipient to determine the user ranking score for the user.

4. The method of claim 1, wherein determining, for each recipient of the two or more recipients, the recipient-specific user ranking score of the user with respect to the recipient, comprises calculating, using the received interaction data, a probability that the recipient will interact with a particular item of digital content distributed by the user.

5. The method of claim 3, wherein the two or more recipients comprises all direct contacts of the user within the social networking service.

6. The method of claim 1, wherein determining the item ranking score associated with each item of the set of items of digital content comprises:
   determining, for each recipient of the two or more recipients, a recipient-specific item ranking score of the item with respect to the recipient to provide a plurality of recipient-specific item ranking scores;
   aggregating the plurality of recipient-specific item ranking scores to determine an initial item ranking score;
   determining a time decay parameter associated with the particular digital content item; and
   degrading the initial item ranking score based on the time decay parameter to provide the item ranking score.

7. The method of claim 6, wherein determining, for each recipient of the two or more recipients, the recipient-specific item ranking score of the item with respect to the recipient comprises calculating, using the received interaction data, a probability that the recipient will interact with a particular digital content item.

8. The method of claim 1, further comprising:
   receiving a search query;
   receiving search results responsive to the search query;
   determining that the search results comprise a set of users of the social networking service, the set of users including the user, and, in response, retrieving a plurality of user ranking scores, each user ranking score assigned to a respective user in the set of users
   determining, based on the plurality of user ranking scores, a user rank order; and
   providing instructions to display representations of the users based on the user rank order.

9. The method of claim 8, wherein retrieving the plurality of user ranking scores comprises accessing a user index stored in computer-readable memory.

10. The method of claim 1, further comprising:
receiving a search query;
receiving search results responsive to the search query;
determining that the search results comprise a plurality of items of digital content distributed through the social networking service, the plurality of items of digital content including the set of items of digital content, and, in response, retrieving a plurality of item ranking scores;
determining, based on the plurality of item ranking scores, an item rank order; and
providing instructions to display representations of the digital content items based on the item rank order.

11. The method of claim 10, wherein retrieving the plurality of item ranking scores comprises accessing item data sets stored in computer readable memory.

12. The method of claim 1, wherein the recipient-specific user ranking score, for a particular recipient of the two or more recipients, is based on a ratio of the number of interactions by the particular recipient to the number of items included by the set of items of digital content.

13. A non-transitory computer-readable medium coupled to one or more processors having instructions stored thereon which, when executed by the one or more processors, cause the one or more processors to perform operations comprising:
identifying, using the one or more processors, a set of items of digital content distributed by the user through a computer-implemented social networking service;
receiving, from the computer-readable memory, interaction data, the interaction data representing interactions of two or more recipients with the items of digital content in the set of items of digital content;
determining, based on the received interaction data, a number of interactions by each recipient of the two or more recipients with the set of items of digital content;
identifying a number of items included by the set of items of digital content that is distributed by the user through the computer-implemented networking service to the two or more recipients;
determining, based on the received interaction data, i) for each recipient of the two or more recipients, a recipient-specific user ranking score of the user with respect to the recipient and ii) an item ranking score associated with each item of the set of items of digital content, each recipient-specific user ranking score based on i) the number of interactions by the associated recipient with the set of items of digital content and ii) the number of items included by the set of items of digital content;
storing, for each recipient of the two or more recipients, the recipient-specific user ranking score and the item ranking score associated with each item of the set of items in the computer-readable memory; and
providing for display one or more of the set of items of digital content based on the user ranking score and the item ranking score.

14. A system comprising:
a computing device; and
a computer-readable medium coupled to the computing device and having instructions stored thereon which, when executed by the computing device, cause the computing device to perform operations comprising:
identifying, using the one or more processors, a set of items of digital content distributed by the user through a computer-implemented social networking service;
receiving, from the computer-readable memory, interaction data, the interaction data representing interactions of two or more recipients with the items of digital content in the set of items of digital content;
determining, based on the received interaction data, a number of interactions by each recipient of the two or more recipients with the set of items of digital content;
identifying a number of items included by the set of items of digital content that is distributed by the user through the computer-implemented networking service to the two or more recipients;
determining, based on the received interaction data, i) for each recipient of the two or more recipients, a recipient-specific user ranking score of the user with respect to the recipient and ii) an item ranking score associated with each item of the set of items of digital content, each recipient-specific user ranking score based on i) the number of interactions by the associated recipient with the set of items of digital content and ii) the number of items included by the set of items of digital content;
storing, for each recipient of the two or more recipients, the recipient-specific user ranking score and the item ranking score associated with each item of the set of items in the computer-readable memory; and
providing for display one or more of the set of items of digital content based on the user ranking score and the item ranking score.

* * * * *